(No Model.)
S. W. ROBINSON.
NAILING MACHINE FOR BOOTS OR SHOES.
No. 447,359. Patented Mar. 3, 1891.
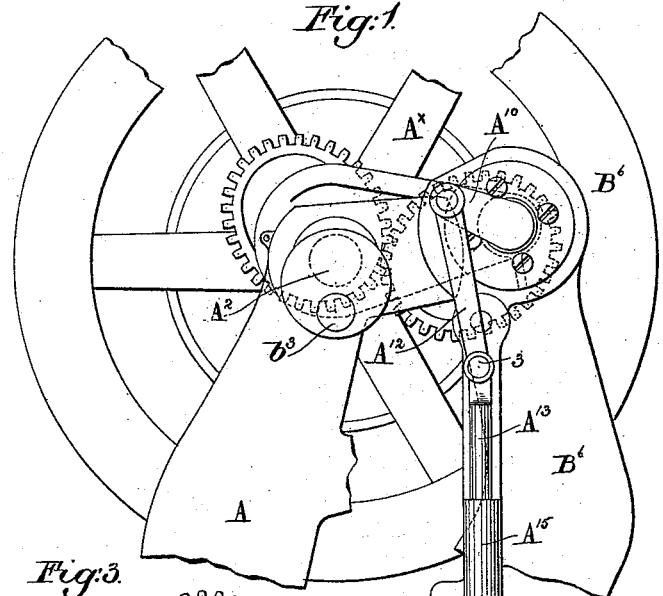
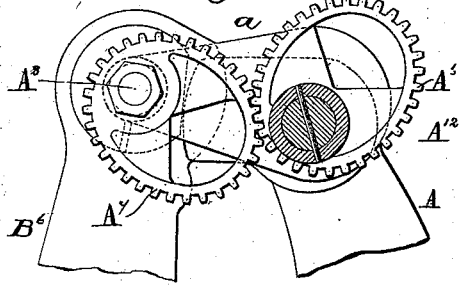
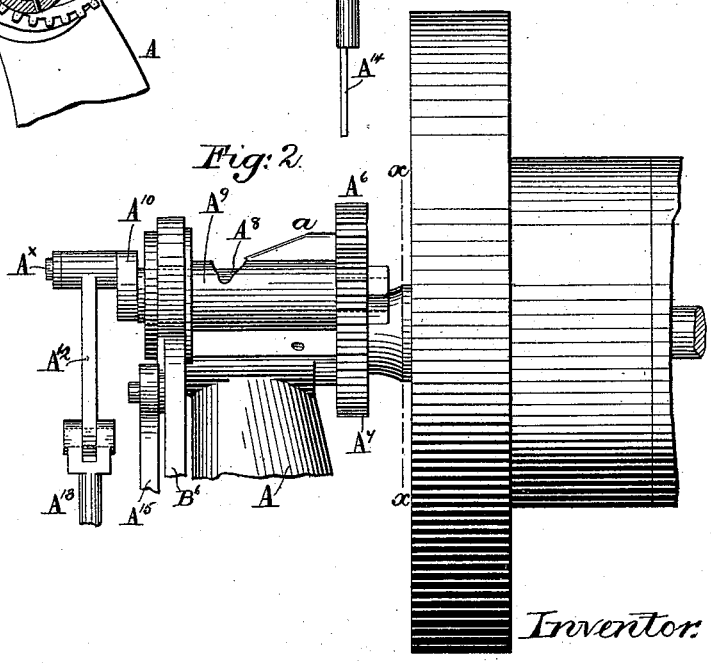
Witnesses:
Fred. L. Greenleaf.
Frederick L. Emery.
Inventor:
Stillman W. Robinson,
by Crosby & Gregory
Attys

UNITED STATES PATENT OFFICE.

STILLMAN W. ROBINSON, OF COLUMBUS, OHIO, ASSIGNOR TO THE WIRE GRIP FASTENING COMPANY, OF CHICAGO, ILLINOIS.

NAILING-MACHINE FOR BOOTS OR SHOES.

SPECIFICATION forming part of Letters Patent No. 447,359, dated March 3, 1891.

Application filed June 10, 1890. Serial No. 354,944. (No model.)

*To all whom it may concern:*

Be it known that I, STILLMAN W. ROBINSON, of Columbus, county of Franklin, State of Ohio, have invented an Improvement in Nailing-Machines for Boot or Shoe Work, of which the following description, in connection with the accompanying drawings, is a specification, like letters and numerals on the drawings representing like parts.

This invention has for its object to provide novel means for actuating the driver positively, but at a variable speed, whereby the descent of the driver-bar to drive the fastener is accomplished at a fast speed, the upward movement of the driver-bar and while the actuating crank-pin is passing over its dead-center being at a slower speed. This is accomplished by the employment of non-circular gears, one being on the main shaft of the machine, the other being on the driver-actuating crank-shaft, the latter being mounted, as herein shown, in a bearing of a yoke pivoted on the main driving-shaft, the crank-pin of the said driver-actuating shaft being connected by a suitable link with the driver-bar. The employment of these gears enables the usual spring which actuates the driver-bar to be dispensed with.

Figure 1, in side elevation, shows a portion of a nailing-machine with the invention herein contained applied thereto. Fig. 2 is a right-hand elevation of the parts shown in Fig. 1; and Fig. 3, a partial section to the left of the dotted line $x$, Fig. 2.

A represents part of the frame-work of a nailing-machine; $A^2$, the main shaft therein; $A^6$, a non-circular gear fast on the said shaft, and $B^6$ a part of a frame.

$a$ is a yoke mounted loosely on the shaft $A^2$ and provided at its front end with a tubular bearing $A^9$, a portion of which enters the frame $B^6$.

$A^8$ is the driver-actuating shaft, adapted to rotate in the bearing $A^9$.

$A^7$ is a non-circular gear fast on one end of the shaft $A^8$, $A^{10}$ being a crank on the opposite end of the said shaft.

$A^{12}$ is a link connected at its upper end to the crank-pin $A^\times$ and at its lower end to pin 3 at the upper end of the driver-bar $A^{13}$, adapted to slide in the guide $A^{15}$ and provided with the driver $A^{14}$.

Application Serial No. 354,706, filed on the 9th day of June, 1890, shows all the parts so far referred to; but in the said application the gear $A^7$, instead of being fast on the shaft $A^8$, is loose thereon and provided with a pin to be engaged by a dog fast on the said shaft, the descent of the driver being effected by a strong spiral spring, the omission of which is the chief object of this invention. To omit the said spring, the gear $A^7$ has been fastened directly to the shaft $A^8$, said gears, fast each to its own shaft and actuated the one by the other, causing a variable speed of rotation for the crank-shaft, which is of great advantage in machines running with moderate speeds of from two hundred to four hundred blows per minute, in which, with circular gears in place of the said non-circular ones, the driver would descend so slowly as to drive the nail more as if by pressure than by a blow, while with the non-circular gears the driver-crank $A^{10}$ can be given a speed at the rate of one thousand to two thousand revolutions per minute at the instant of driving the nail, whereby the action upon the nail approximates that of the swift descent of a driver when forced down by a spring, such quick driving action usually being found necessary to the most successful driving of nails, especially where the nail is to be clinched; also, in machines where several operations are to follow each other in succession—such as making an awl-hole, feeding the work along, moving in a nail-slide, &c.— it has been found necessary to bring the driver down and up quickly, that it may be out of the way, which requirement is admirably met with the use of the above-described non-circular gears.

In the drawings, the bearing $A^9$ for the shaft $A^8$ is represented as adapted to swing around the main shaft $A^2$, and so also the bearing $A^9$ is shown as entering the frame $B^6$, shown as a slide-frame; but this invention is not limited to the exact construction of the bearing $A^9$ and arm $a$, as the latter may be a part of the main frame-work, the same not interfering in the least with the proper driving action of the invention herein described. The non-circular gears fast on the said shafts give a variable motion to the driver-bar, and these gears, when employed to actuate the driver-bar of any machine for driving fastenings, come within my invention. The yoke $a$ by being pivoted on the main shaft is free to swing or turn about said shaft and permit the driver crank-shaft to rise when the stock is released to be fed, all as fully described in said application.

I am aware prior to my invention that elliptical or non-circular gears have been used for variations in speed; but prior to my invention I am not aware that a nailing-machine has ever had its driver-bar actuated by non-circular gears so located each with relation to the other as to hasten the descending stroke of the driver-bar when driving a fastener, the said gears serving as a substitute for a quick-acting spring.

It is well known that the motions derived from springs are objectionable and cannot be relied upon as can positive motions.

I claim—

The combination, in a nailing-machine, of the following instrumentalities, viz: a driver-bar, a guide therefor, and crank-shaft to actuate the driver-bar, a link to connect the said bar and crank-shaft, a pivoted yoke $a$, forming bearings for the said crank-shaft, the main shaft $A^2$, and non-circular gears fast to the said shafts, whereby the main shaft driven at a uniform speed actuates the crank-shaft at a varying speed, to thus hasten the descent of the driver-bar and enable the driver carried by it to strike a nail, the driver-bar being actuated positively both in its ascent and descent, substantially as described.

In testimony whereof I have signed my name to this specification in the presence of two subscribing witnesses.

STILLMAN W. ROBINSON.

Witnesses:
C. C. SHEPHERD,
BARTON GRIFFITH.